United States Patent [19]
Abe et al.

[11] 3,821,312
[45] June 28, 1974

[54] ALKYLTHIO NITRODIPHENYL ETHERS

[76] Inventors: Yasunori Abe, 326-1 Futatsumiya, Omiya; Nobuo Yamane, 654 Azeyashi, Ageo-shi; Kensaku Itoh, 1090-Kamiochiai, Yono; Shuichi Ishida, 972, Hongo-cho, Omiya; Hisabumi Kobayashi, 1039-Kamiochiai, Yono, all of Japan

[22] Filed: Dec. 4, 1972

[21] Appl. No.: 311,746

Related U.S. Application Data

[62] Division of Ser. No. 143,187, May 13, 1971.

[52] U.S. Cl. ............. 260/609 F, 260/607 A, 71/98, 71/103
[51] Int. Cl. ...... C07c 149/32, C07c 147/00, C07c 147/14
[58] Field of Search ..................... 260/607 A, 609 F

[56] References Cited
UNITED STATES PATENTS
3,098,105  7/1963  Reifschneider.................. 260/609 F
3,384,670  5/1968  Reifschneider.................. 260/609 F FOREIGN PATENTS OR APPLICATIONS
1,930,526  12/1970  Germany ...................... 260/607 A
1,173,278  12/1969  Great Britain ................. 260/607 A OTHER PUBLICATIONS
Chem. Abstracts–18647 A–Vol. 55.

Primary Examiner—Lewis Gotts
Assistant Examiner—D. R. Phillips
Attorney, Agent, or Firm—Russell & Nields

[57] ABSTRACT

New compounds having the general formula

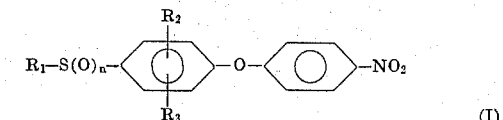

wherein $R_1$ represents a lower alkyl or allyl radical, $R_2$ represents a hydrogen or chlorine atom or a methyl radical, $R_3$ represents a hydrogen or chlorine atom, $R_2$ and $R_3$ may be identical or different and n is 0, 1 or 2; said compounds are manufactured by condensing phenol compounds having the general formula

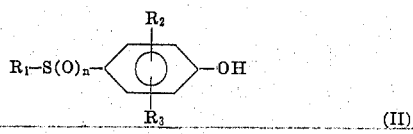

(wherein $R_1$, $R_2$ and $R_3$ have the same meanings as mentioned above and n is 0, 1 or 2,) with p-chloronitrobenzene in the presence of an acid binding agent. Said new compounds have a selective and lasting herbicidal effect.

3 Claims, No Drawings

ALKYLTHIO NITRODIPHENYL ETHERS

This is a division of application, Ser. No. 143,187 filed May 13, 1971.

DETAILED EXPLANATION OF INVENTION

This invention relates to new compounds having the following general formula

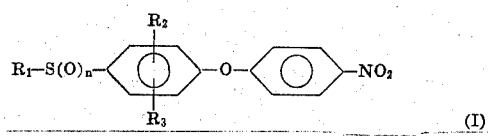

wherein $R_1$ represents a lower alkyl or allyl radical, $R_2$ represents a hydrogen or chlorine atom or methyl radical, $R_3$ represents a hydrogen or chlorine atom, and $R_2$ and $R_3$ may be identical or different, and $n$ is 0, 1 or 2, and a process for the manufacture thereof.

It has been found that compounds having the above mentioned general formula (I) show an excellent lasting rapid herbicidal effect against fam. poaceae weeds such as barnyard grass and crab grass as well as broadleaf weeds such as pig weed, and more safety with respect to useful crops and further that undesirable weeds can be prevented selectively for a long time of period by these properties in a paddy field, a field, an orchard, a mulberry field, a turfed area, a pasture etc. while causing no harm to cultivated crops, resulting in the completion of this invention.

Accordingly, the object of this invention is to provide new compounds having an excellent herbicidal effect.

Another object of this invention is to provide a process for the manufacture of such new compounds.

A still further object of this invention is to provide herbicides excellent in the properties of selectivity and lasting.

Effective ingredient compounds (I) to be used in this invention can be synthesized by the process shwon by the following reaction formula:

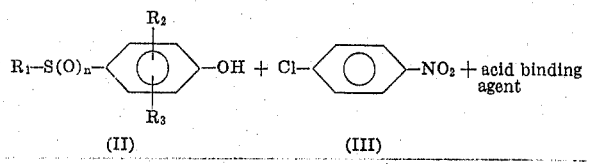

wherein $R_1$, $R_2$, $R_3$ and $n$ have the same meanings as mentioned above.

The synthesis according to the reaction formula as mentioned above is described as follows: the starting material comprises compounds of the formula (II) and p-chloronitrobenzene, the ratio of the former to the latter being in general between 1.0 and 1.2 times the calculated amount. It is possible however to use a large amount of compound (II) as solvent without using an inert solvent. As acid binding agents, there is used in general sodium or potassium hydroxide in an amount slightly in excess of the calculated amount. When aprotic polar solvents are used as the reaction solvent, potassium carbonate is also an effective acid binding agent.

While the reaction solvent is not absolutely necessary, the use of aprotic polar solvents such as dimethyl sulfoxide, dimethyl formamide, dimethyl acetamide, diethyl ether and diethylene glycol or protic polar solvents such as diethylene glycol monoethyl ether causes the reaction to proceed more smoothly. These solvents may be used not only in any amount as reaction solvent as common sense would indicate, but also in such a small amount as less than one-tenth of compound (II) resulting in a best result. The reaction temperature is 100° – 200°C, preferably 120° – 180°C.

In general, the reaction proceeds smoothly, i.e. more than 95 percent in 2 hrs., but occasionally it may be necessary to react for about 6 hrs. depending on the reaction conditions or the characteristics of compound (II).

After the reaction, or after the distillation of the solvent after the reaction, the reaction mixture is cooled below 100°C, water is added, the separating oil is extracted with a suitable organic solvent, e.g. benzene, the unreacted compound (II) in the extract is removed by washing with dilute aqueous solution of alkali hydroxide and the solvent is removed by distillation to yield the desired compound (I) in an available purity.

Compounds of the formula (I), wherein $n$ is 0, which are obtained as mentioned above, can be oxidized further by adding an oxidizing agent such as hydrogen peroxide, potassium permanganate or nitric acid to the corresponding sulfoxide or sulfone compounds.

Typical examples of active ingredient compounds in this invention, which are represented by the general formula (I) and obtained in such manner as mentioned above, are given in Table I.

Table 1

Example of the Active Ingredient

| No. | Name of Compound | Appearance | Melting Point (20°C) | Molecular formula | | C | H | N |
|---|---|---|---|---|---|---|---|---|
| 1 | 4-methylthio-4'-nitro-diphenyl ether | pale yellow crystal | 63–4 | $C_{13}H_{11}NO_3S$ | Calc. Found | 59.60 59.60 | 4.24 4.20 | 5.36 5.49 |
| 2 | 3-chloro-4-methylthio-4'-nitro-diphenyl ether | pale yellow needles | 103–104 | $C_{13}H_{10}ClNO_3S$ | | 52.79 52.60 | 3.41 3.70 | 4.74 4.53 |
| 3 | 2-chloro-4-methylthio-4'-nitro-diphenyl ether | pale yellow crystal | 85–6 | do. | | 52.79 52.75 | 3.41 3.32 | 4.74 4.64 |
| 4 | 2,6-dichloro-4-methylthio-4'-nitrodiphenyl ether | pale yellow crystal | 155–6 | $C_{13}H_9CL_2NO_3S$ | | 47.29 47.19 | 2.75 2.73 | 21.48 21.38 |
| 5 | 2-methyl-4-methylthio-4'-nitro-diphenyl ether | yellow oil | $n_D^{25} 1.6409$ | $C_{14}H_{13}NO_3S$ | | 61.07 61.27 | 4.76 4.70 | 5.09 5.00 |
| 6 | 3-methyl-4-methylthic-4'-nitro-diphenyl ether | yellow crystal | 83–85 | do. | | 61.07 61.22 | 4.76 4.77 | 5.09 5.27 |
| 7 | 4-ethylthio-4'-nitro-diphenyl ether | yellow plates | 53–54 | do. | | 61.07 61.00 | 4.76 4.59 | 5.09 5.00 |
| 8 | 2-chloro-4-ethylthio-4'-nitro diphenyl ether | pale yellow oil | $n_D^{25} 1.6355$ | $C_{14}H_{12}ClNO_3S$ | | 54.28 54.11 | 3.90 3.82 | 4.52 4.77 |

Table 1—Continued

Example of the Active Ingredient

| No. | Name of Compound | Appearance | Melting Point (20°C) | Molecular formula | C | H | N |
|---|---|---|---|---|---|---|---|
| 9 | 3-methyl-4-ethylthio-4'-nitro diphenyl ether | yellow needles | 66–68 | $C_{15}H_{15}NO_3S$ | 62.26 / 62.10 | 5.23 / 5.18 | 4.84 / 4.70 |
| 10 | 4-n-propylthio-4'-nitro-diphenyl ether | pale yellow oil | $n_D^{25}1.6220$ | do. | 62.26 / 62.18 | 5.23 / 5.20 | 4.84 / 4.73 |
| 11 | 4-allylthio-4'-nitro-diphenyl ether | pale yellow oil | $n_D^{25}1.6306$ | $C_{15}H_{13}NO_3S$ | 62.70 / 62.53 | 4.56 / 4.72 | 4.86 / 4.55 |
| 12 | 2-chloro-4'-n-propylthio-4'-nitro diphenyl ether | pale yellow oil | $n_D^{25}1.6248$ | $C_{15}H_{14}ClNO_3S$ | 55.64 / 55.49 | 4.36 / 4.10 | 4.33 / 4.22 |
| 13 | 4-4-butylthio-4'-nitro-diphenyl ether | yellow oil | $n_D^{25}1.6109$ | $C_{16}H_{17}NO_3S$ | 63.34 / 63.12 | 5.65 / 5.43 | 4.62 / 4.50 |
| 14 | 3-methylthio-4'-nitro-diphenyl ether | yellow needles | 83–85 | $C_{13}H_{11}NO_3S$ | 59.75 / 59.91 | 4.24 / 4.23 | 5.36 / 5.60 |
| 15 | 3-ethylthio-4'-nitro-diphenyl ether | pale yellow crystal | 51.5–54 | $C_{14}H_{13}NO_3S$ | 61.07 / 61.30 | 4.70 / 4.82 | 5.09 / 5.00 |
| 16 | 3-n-propylthio-4'-nitro-diphenyl ether | pale yellow crystal | 52–53 | $C_{15}H_{15}NO_3S$ | 62.26 / 62.25 | 5.23 / 5.19 | 4.86 / 4.64 |
| 17 | 3-n-butylthio-4'-nitro-diphenyl ether | pale yellow oil | $n_D^{25}1.6016$ | $C_{16}H_{17}NO_3S$ | 63.34 / 63.48 | 5.65 / 5.18 | 4.62 / 4.50 |
| 18 | 3-n-hexylthio-4'-nitro-diphenyl ether | pale yellow oil | $n_D^{25}1.5943$ | $C_{18}H_{21}NO_3S$ | 65.23 / 65.45 | 6.39 / 6.43 | 4.23 / 4.33 |
| 19 | 2-methylthio-4'-nitro-diphenyl ether | pale yellow needles | 96–98 | $C_{13}H_{11}NO_3S$ | 59.75 / 59.59 | 4.24 / 4.28 | 5.36 / 5.18 |
| 20 | 2-methylthio-4-chloro-4'-nitro-diphenyl ether | pale yellow needles | 77–78 | $C_{13}H_{10}ClNO_3S$ | 52.80 / 52.90 | 3.41 / 3.43 | 4.74 / 4.90 |
| 21 | 2-n-propylthio-4'-nitro-diphenyl ether | pale yellow needles | 51–52 | $C_5H_{15}NO_3S$ | 62.26 | 5.23 | 4.84 |
| 22 | 4-methylsulfinyl-4'-nitro-diphenyl ether | pale yellow oil | $n_D^{25}1.6210$ | $C_{13}H_{11}NO_4S$ | 56.31 / 56.50 | 4.00 / 4.21 | 5.05 / 5.30 |
| 23 | 2-chloro-4-methylsulfinyl-4'-nitro-diphenyl ether | pale yellow crystal | 88–90 | $C_{13}H_{11}ClNO_4S$ | 50.09 / 50.45 | 3.23 / 3.23 | 4.49 / 4.46 |
| 24 | 4-ethylsulfinyl-4'-nitro-diphenyl ether | pale yellow oil | $n_D^{25}1.6145$ | $C_{14}H_{13}NO_4S$ | 57.72 / 57.50 | 4.50 / 4.48 | 4.81 / 4.68 |
| 25 | 4-n-propylsulfinyl-'-nitro-diphenyl ether | yellow crystal | 49–51 | $C_{15}H_{15}NO_4S$ | 59.00 / 59.21 | 4.95 / 4.83 | 4.59 / 4.63 |
| 26 | 2-chloro-4-n-propylsulfinyl-4'-nitro diphenyl ether | pale yellow crystal | 91–92 | $C_{15}H_{14}ClNO_4S$ | 53.02 / 52.99 | 4.16 / 4.31 | 4.12 / 4.29 |
| 27 | 4-n-butylsulfinyl-4'-nitro-diphenyl ether | yellow oil | $n_D^{25}1.6070$ | $C_{16}H_{17}NO_4S$ | 60.17 / 60.00 | 5.37 / 5.18 | 4.39 / 4.18 |
| 28 | 3-ethylsulfinyl-4'-nitro-diphenyl ether | pale yellow oil | $n_D^{25}1.5984$ | $C_{14}H_{13}NO_4S$ | 57.72 / 57.59 | 4.50 / 4.33 | 4.81 / 4.62 |
| 29 | 3-n-propylsulfinyl-4'-nitro-diphenyl ether | pale yellow oil | $n_D^{25}1.6124$ | $C_{15}H_{15}NO_4S$ | 59.00 / 58.87 | 4.95 / 5.02 | 4.59 / 4.62 |
| 30 | 3-n-butylsulfinyl-4'-nitro-diphenyl ether | pale yellow oil | $n_D^{25}1.5867$ | $C_{16}H_{17}NO_4S$ | 60.36 / 60.19 | 5.07 / 5.23 | 4.40 / 4.66 |
| 31 | 3-n-hexylsulfinyl-4'-nitro-diphenyl ether | pale yellow oil | $n_D^{25}1.5709$ | $C_{18}H_{21}NO_4S$ | 62.23 / 62.33 | 6.09 / 6.11 | 4.03 / 4.29 |
| 32 | 4-methylsulfonyl-4'-nitro-diphenyl ether | pale yellow needles | 131–133 | $C_{13}H_{11}NO_5S$ | 53.24 / 53.10 | 3.78 / 3.70 | 4.78 / 4.98 |
| 33 | 2-chloro-4-methylsulfonyl-4'-nitro-diphenyl ether | pale yellow crystal | 132–134 | $C_{13}H_{10}ClNO_5S$ | 47.64 / 47.94 | 3.08 / 3.08 | 4.27 / 4.59 |
| 34 | 3-chloro-4-methylsulfonyl-'-nitro-diphenyl ether | pale yellow needles | 150–153 | do. | 47.64 / 47.73 | 3.06 / 3.17 | 4.27 / 4.20 |
| 35 | 2,6-dichloro-4-methylsulfonyl-4'-nitro-diphenyl ether | pale yellow needles | 212–215 | $C_{13}H_9Cl_2NO_5S$ | 43.11 / 43.08 | 2.51 / 2.50 | 3.87 / 3.66 |
| 36 | 2-methyl-4-methylsulfonyl-4'-nitro-diphenyl ether | pale yellow needles | 142–144 | $C_{14}H_{13}NO_5S$ | 54.71 / 54.68 | 4.26 / 4.20 | 4.56 / 4.73 |
| 37 | 3-methyl-4-methylsulfonyl-4'-nitro-diphenyl ether | white crystal | 120–121 | do. | 54.71 / 54.49 | 4.26 / 4.33 | 4.56 / 4.80 |
| 38 | 4-ethylsulfonyl-4'-nitro-diphenyl ether | pale yellow crystal | 95–97 | do. | 54.71 / 54.53 | 4.26 / 4.41 | 4.56 / 4.60 |
| 39 | 2-chloro-4-ethylsulfonyl-4'-nitro-diphenyl ether | pale yellow crystal | 75.5–77 | $C_{14}H_{12}ClNO_5S$ | 49.20 / 49.08 | 3.54 / 3.71 | 4.10 / 4.32 |
| 40 | 4-n-propylsulfonyl-4'-nitro-diphenyl ether | pale yellow crystal | 86–88 | $C_{15}H_{15}NO_5S$ | 56.06 / 56.21 | 4.70 / 4.63 | 4.36 / 4.09 |
| 41 | 2-chloro-4-n-propylsulfonyl-4'-nitro-diphenyl ether | pale yellow crystal | 102.5–104 | $C_{15}H_{14}ClNO_5S$ | 50.64 / 50.60 | 3.97 / 3.81 | 3.94 / 3.73 |
| 42 | 4-n-butylsulfonyl-4'-nitro-diphenyl ether | pale yellow crystal | 61–64 | $C_{16}H_{17}NO_5S$ | 57.30 / 57.20 | 5.11 / 5.23 | 3.90 / 3.80 |
| 43 | 3-methylsulfonyl-4'-nitro-diphenyl ether | pale yellow needles | 121–123 | $C_{13}H_{11}NO_5S$ | 53.24 / 53.20 | 3.78 / 3.91 | 4.78 / 4.70 |
| 44 | 3-ethylsulfonyl-4'-nitro-diphenyl ether | pale yellow crystal | 75–76.5 | $C_{14}H_{13}NO_5S$ | 54.71 / 54.81 | 4.26 / 4.43 | 4.56 / 4.38 |
| 45 | 3-propylsulfonyl-4'-nitro-diphenyl ether | pale yellow needle | 101–102 | $C_{15}H_{15}NO_5S$ | 56.06 / 56.02 | 4.71 / 4.69 | 4.36 / 4.17 |
| 46 | 3-n-butylsulfonyl-4'-nitro-diphenyl ether | pale yellow crystal | 71–73 | $C_{16}H_{17}NO_5S$ | 57.47 / 57.39 | 4.82 / 4.70 | 4.19 / 4.31 |
| 47 | 3-n-hexylsulfonyl-4'-nitro-diphenyl ether | pale yellow crystal | 52.5–54 | $C_{18}H_{21}NO_5S$ | 59.49 / 59.38 | 5.82 / 5.70 | 3.85 / 3.90 |
| 48 | 2-methylsulfonyl-4'-nitro-diphenyl ether | pale yellow needles | 163–165 | $C_{13}H_{11}NO_5S$ | 53.24 / 53.10 | 3.78 / 3.88 | 4.78 / 4.59 |
| 49 | 2-methylsulfonyl-4-chloro-4'-nitro diphenyl ether | pale yellow needles | 171–173 | $C_{13}H_{10}ClNO_5S$ | 47.64 / 47.71 | 3.08 / 3.22 | 4.27 / 4.39 |
| 50 | 2-n-propylsulfonyl-4'-nitro diphenyl ether | pale yellow needles | 133–135 | $C_{15}H_{15}NO_5S$ | 56.06 / 56.21 | 4.70 / 4.63 | 4.36 / 4.09 |

The following experimental examples illustrate the excellent herbicidal effect of the active ingredient compounds according to this invention with a very little undesirable effect (harm caused by the active ingredient) against useful crops.

EXPERIMENTAL EXAMPLE 1

Field: Soil treatment pre-emergence

A given amount of diluvial vegetable soil is placed in four 1/5000a Wagner pots and 10 upland rice seeds and 5 soybean seeds as typical crops and 0.2 g of crab grass seeds and 0.1g of pig weed seeds, both of which are the main weeds in the field as typical weeds, are sowed in each pot with a covering soil of about 1 cm thick and each 20 ml of liquid reagent diluted with well water is scattered on the soil surface so that the active ingredient compound according to this invention may be 50g/a and 100g/a respectively. The amount of remaining weeds and the growth condition of crops are observed on the twentieth day after the treatment. The results of observation are shown in the Table 2.

As obviously seen from the Table 2, the active ingredient compounds according to this invention show excellent herbicidal effects against crab grass (annual grass weed) and pig weed (broadleaf grass weed), which require a great weeding labour in the crop field cultivation, and on the other hand, there is observed no harm against crops such as upland rice and soybean.

Further, an experimental example is given as follows, in which the excellent effect as herbicide for field crops is confirmed by the field test.

Table 2

| | | Effects on Weeds and Crops* | | | | |
|---|---|---|---|---|---|---|
| Active ingredient | | Weed control** | | Crop injury** | | |
| No. | dose(g/a) | Crab grass | Pig weed | Rice | Soybean | Remark |
| 1 | 50 | 10 | 10 | 0 | 0 | |
|   | 100 | 10 | 10 | 0 | 0 | |
| 3 | 50 | 10 | 10 | 0 | 0 | |
|   | 100 | 10 | 10 | 0 | 1 | |
| 5 | 50 | 9 | 9 | 0 | 0 | |
|   | 100 | 10 | 10 | 0 | 0 | |
| 7 | 50 | 9 | 9 | 0 | 0 | |
|   | 100 | 10 | 10 | 0 | 0 | |
| 12 | 50 | 7 | 9 | 0 | 0 | |
|   | 100 | 9 | 10 | 0 | 0 | |
| 16 | 50 | 10 | 10 | 0 | 0 | *** |
|   | 100 | 10 | 10 | 0 | 0 | |
| 17 | 50 | 7 | 7 | 0 | 0 | *** |
|   | 100 | 9 | 8 | 0 | 0 | |
| 19 | 50 | 8 | 7 | 0 | 0 | |
|   | 100 | 9 | 9 | 0 | 0 | |
| 22 | 50 | 7 | 8 | 0 | 0 | |
|   | 100 | 8 | 9 | 0 | 0 | |
| 23 | 50 | 10 | 10 | 0 | 0 | |
|   | 100 | 10 | 10 | 0 | 0 | |
| 26 | 50 | 7 | 10 | 0 | 0 | |
|   | 100 | 8 | 10 | 0 | 0 | |
| 29 | 50 | 10 | 10 | 0 | 0 | *** |
|   | 100 | 10 | 10 | 0 | 0 | |
| 30 | 50 | 7 | 9 | 0 | 0 | *** |
|   | 100 | 8 | 10 | 0 | 0 | |
| 32 | 50 | 7 | 7 | 0 | 0 | |
|   | 100 | 8 | 8 | 0 | 0 | |
| 33 | 50 | 10 | 10 | 0 | 0 | |
|   | 100 | 10 | 10 | 0 | 0 | |
| 34 | 50 | 9 | 9 | 0 | 0 | |
|   | 100 | 10 | 10 | 0 | 0 | |
| 35 | 50 | 9 | 10 | 0 | 0 | |
|   | 100 | 9 | 10 | 0 | 0 | |
| 36 | 50 | 9 | 10 | 0 | 0 | |
|   | 100 | 10 | 10 | 0 | 0 | |
| 37 | 50 | 10 | 10 | 0 | 0 | |
|   | 100 | 10 | 10 | 0 | 0 | |
| 38 | 50 | 8 | 10 | 0 | 0 | |
|   | 100 | 9 | 10 | 0 | 0 | |
| 41 | 50 | 6 | 10 | 0 | 0 | |
|   | 100 | 7 | 10 | 0 | 0 | |
|   | 50 | 10 | 10 | 0 | 0 | *** |

Table 2 — Continued

Effects on Weeds and Crops*

| Active ingredient No. | dose(g/a) | Weed control** Crab grass | Pig weed | Crop injury** Rice | Soybean | Remark |
|---|---|---|---|---|---|---|
| 45 | 100 | 10 | 10 | 0 | 0 | |
|  | 50 | 7 | 8 | 0 | 0 | *** |
| 46 | 100 | 9 | 9 | 0 | 0 | |
|  | 50 | 8 | 7 | 0 | 0 | |
| 48 | 100 | 9 | 8 | 0 | 0 | |
|  | 50 | 7 | 7 | 0 | 0 | |
| 49 | 100 | 8 | 9 | 0 | 0 | |
| Untreated check | | 0 | 0 | 0 | 0 | |

Note:
*An active ingredient was applied on soil surface as pre-emergence treatment.
**0 = no effect. 10 = complete kill.
***Weeds showed albino.

EXPERIMENTAL EXAMPLE 2

Soil treatment test after sseding in the crop field

A given amount of seeds of six plants, i.e. corn, soybean cotton, upland rice and wheat as the principal field crops and carrot, which requires most labour in weeding among vegetables, are sowed in lines and covered with soil according to a common cultivation. For the confirmation of herbicidal effect, a given amount of seeds of crab grass and pig weed other than spontaneous weeds are mixed uniformly in the surface soil of about 1 cm thick. Each test section of 1 $m^2$ consists of a pair of areas and the surface of soil in each section is treated with a liquid reagent diluted with well water at a rate of 20 l/a after sowing so that the amount of active ingredient compound according to this invention may be 20, 30, 40, 80 and 120g/a respectively. The amount of remaining weeds and the growth condition of crops are observed in each test section on the twenty fifth day after the treatment. The results of observation are given in the following Table 3.

As seen in the Table 3, the active ingredient compound according to this invention is very safe against important products in the field such as corn, soybean, cotton, upland rice, wheat and carrot even in as high amount as 120g/a while causing no harm or very little effect. On the other hand, crab grass and pig weed as main weeds in the field as well as almost all annual weeds can be prevented nearly completely with an amount of reagent less than 40g/a.

While the active ingredient compounds according to this invention have an excellent effect as herbicide in field cultivation as shown in the above experimental examples 1 and 2, the following experimental examples illustrate that the compound shows also an excellent effect as herbicide in the paddy field and can be used as herbicide in many applications.

TABLE 3 — EFFECTS ON UPLAND CROPS AND WEEDS*

| Active ingredient No. | 3 | | | | | 16 | | | | | 23 | | | | | 29 | | | | | 30 | | | | | 33 | | | | | 45 | | | | | Untreated check |
|---|---|---|---|---|---|---|---|---|---|---|---|---|---|---|---|---|---|---|---|---|---|---|---|---|---|---|---|---|---|---|---|---|---|---|---|---|
| Dose (g/a) | 20 | 30 | 40 | 80 | 120 | 20 | 30 | 40 | 80 | 120 | 20 | 30 | 40 | 80 | 120 | 20 | 30 | 40 | 80 | 120 | 20 | 30 | 40 | 80 | 120 | 20 | 30 | 40 | 80 | 120 | 20 | 30 | 40 | 80 | 120 | |
| Plants | | | | | | | | | | | | | | | | | | | | | | | | | | | | | | | | | | | | |
| Crops: | | | | | | | | | | | | | | | | | | | | | | | | | | | | | | | | | | | | |
| Maize | 0 | 0 | 0 | 1 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Soybean | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Wheat | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Upland-Rice | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 1 | 0 |
| Cotton | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Carrot | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 | 2 | 0 | 0 | 0 | 0 | 1 | 0 | 0 | 0 | 0 | 1 | 0 |
| Weeds: | | | | | | | | | | | | | | | | | | | | | | | | | | | | | | | | | | | | |
| Crab grass | 6 | 7 | 8 | 10 | 10 | 8 | 9 | 10 | 10 | 10 | 9 | 10 | 10 | 10 | 10 | 9 | 10 | 10 | 10 | 10 | 9 | 9 | 9 | 10 | 10 | 9 | 10 | 10 | 10 | 10 | 8 | 9 | 10 | 10 | 10 | 0 |
| Pig weed | 8 | 8 | 9 | 10 | 10 | 9 | 10 | 10 | 10 | 10 | 10 | 10 | 10 | 10 | 10 | 10 | 10 | 10 | 10 | 10 | 9 | 9 | 9 | 10 | 10 | 10 | 10 | 10 | 10 | 10 | 9 | 10 | 10 | 10 | 10 | 0 |
| Other annual weeds | 7 | 8 | 9 | 10 | 10 | 8 | 9 | 10 | 10 | 10 | 9 | 10 | 10 | 10 | 10 | 9 | 9 | 10 | 10 | 10 | 8 | 9 | 8 | 10 | 10 | 9 | 10 | 10 | 10 | 10 | 9 | 10 | 10 | 10 | 10 | 0 |

*Active ingredient was applied on soil surface as pre-emergence treatment.
Effect was expressed by the index; 0 = no effect; 10 = complete kill.

EXPERIMENTAL EXAMPLE 3

Paddy field; Water application after the transplantation of paddy plant

A given amount of alluvial paddy field soil is placed in a 1/10,000a pot and adjusted to the final harrowing condition in the common cultivation, a given amount of seeds of barnyard grass is then sowed and stocks of two yound paddy rice plants, which are previously cultivated, are planted in the pot. The soil is then irrigated suitably for 7 days to keep it wet, water is added on the seventh day to make the water level 3cm deep and 5ml of liquid reagent diluted with well water are added dropwise so that the amount of active ingredient compounds according to this invention may be 50 and 100g/a. The water level is controlled so as to keep 3cm deep during the test. The amount of remaining weeds (barnyard grass) and the growth condition of paddy rice are observed in each test section on the twentieth day after the treatment. The results of observation are given in the Table 4.

Table 4

Effects on Weed and Crop.*

| Active ingredient NO. | dose, g/a | Weed Control*** Barnyard Grass with 1 or 1.5 leaves | Crop Injury*** Paddy rice with 4 or 4.5 leaves |
|---|---|---|---|
| 3 | 50 | 10 | 0 |
|  | 100 | 10 | 0 |
| 8 | 50 | 8 | 0 |
|  | 100 | 9 | 0 |
| 16 | 50 | 10 | 0 |
|  | 100 | 10 | 0 |
| 23 | 50 | 10 | 1 |
|  | 100 | 10 | 2 |
| 29 | 50 | 9 | 0 |
|  | 100 | 10 | 0 |
| 30 | 50 | 6 | 0 |
|  | 100 | 8 | 0 |
| 33 | 50 | 10 | 2 |
|  | 100 | 10 | 2 |
| 37 | 50 | 10 | 0 |
|  | 100 | 10 | 1 |
| 39 | 50 | 8 | 0 |
|  | 100 | 9 | 0 |
| 45 | 50 | 7 | 0 |
|  | 100 | 9 | 0 |
| Untreated check |  | 0 | 0 |

*Active ingredient was applied in water of paddy field as postemergence treatment.
**Seven day old after transplanted.
***Effects were expressed by the index; 0 = no effect, 10 = complete kill.

EXPERIMENTAL EXAMPLE 4

Paddy field; Soil incorporation layer before the transplantation of paddy rice

A given amount of alluvial paddy field soil is placed in a 1/10,000a and adjusted to the final harrowing condition, 5ml of liquid reagent diluted with well water are added dropwise so that the amount of active ingredient compound according to this invention may be 50 and 100g/a and the surface soil is mixed uniformly up to about 3cm deep. A given amount of seeds of barnyard grass is mixed uniformly in the surface soil of about 1cm deep and stocks of two yound paddy plants, which are previously cultivated, are planted. For the water control during the test, the water level is as low as about 0.5cm from after the treatment to the beginning of the germination of barnyard grass and the water depth of 3cm is kept after the germination. The amount of remaining weeds (barnyard grass) and the growth condition of paddy rice in each test section are observed on the twentieth day after the treatment. The results of observation are given in Table 5.

Table 5

Effects on Weed and Crop.*

| Active ingredient No. | dose, g/a | Weed control Barnyard grass | Crop injury Transplanted paddy rice with 3 or 3.5 leaves |
|---|---|---|---|
| 3 | 50 | 9 | 0 |
|  | 100 | 10 | 0 |
| 9 | 50 | 7 | 0 |
|  | 100 | 9 | 0 |
| 14 | 50 | 7 | 0 |
|  | 100 | 9 | 0 |
| 16 | 50 | 10 | 0 |
|  | 100 | 10 | 0 |
| 29 | 50 | 10 | 0 |
|  | 100 | 10 | 0 |
| 34 | 50 | 9 | 0 |
|  | 100 | 10 | 0 |
| 36 | 50 | 8 | 0 |
|  | 100 | 10 | 0 |
| 45 | 50 | 10 | 0 |
|  | 100 | 10 | 2 |
| Untreated check |  | 0 | 0 |

*Active ingredient was applied as preemergence treatment in mixing with paddy soil.
Effects were expressed by the index; 0 = no effect, 10 = complete kill.

As shown in the experimental examples 4 and 5, the active ingredient compound according to this invention shows also an excellent effect as herbicide in the paddy field.

As mentioned above, the herbicides according to this invention can attain sufficiently the purpose of the invention by using it in an amount of about 15 – 150g/a as active ingredient.

When the active ingredient compounds according to this invention are used as herbicides, it is preferable to use it in admixture with a carrier such as the following: i.e. clay, kaolin, talc, diatomaceous earth, silica, calcium carbonate, sawdust; or benzene, alcohol, acetone, xylene, methyl naphthalene, cyclohexane, dimethyl formamide, dimethyl sulfoxide, animal and vegetable oils, fatty acids, fatty acid esters and various kinds of surface active agents.

Further, auxiliary agents which are used generally in agricultural chemicals, such as one or more extenders, emulsifying, wetting or fixing agents or surface active agents may be added suitably to emphasize or stabilize the effect of active ingredient compounds.

Moreover, the active ingredient compounds or herbicides according to this invention can be used in admixture with other agricultural fungicides, insecticides, nematocides, plant growth controlling agents, soil improving agents or fertilizers.

This invention will be illustrated concretely by the following examples, in which the term "part" is shown by weight.

EXAMPLE 1

2-Chloro-4-methylsulfonyl-4'-nitrodiphenyl ether 3.8g (0.018 mole) of 2-chloro-4-methylsulfonyl phenol and 1.1g (0.0165 mole) of potassium hydroxide are dissolved completely in 50 ml of dimethyl formamide with heating. 2.4g (0.015 mole) or p-chloronitrobenzene is added to the solution and reacted at 130° – 140°C for 3 hrs with heating.

After the reaction, the resulting mixture is cooled, added to 300 ml of water and extracted with benzene. The extract is washed with 5 percent sodium hydroxide and benzene is removed to yield 4.4g (89.7 percent of theoretical value) of 2-chloro-4-methylsulfonyl-4'-nitrodiphenyl ether, which can be recrystallized from ethanol (mp: 132° – 134°C).

Analysis: $C_3H_{10}ClNO_5S$

| | | | |
|---|---|---|---|
| Calculated: | C : 47.94% | H : 3.08% | N : 4.59% |
| Found: | C : 47.64% | H : 3.08% | N : 4.27% |

EXAMPLE 2

3-n-propylthio-4'-nitrodiphenyl ether 3.6g (0.055 mole) of potassium hydroxide are dissolved in 20g (0.119 mole) of 3-n-propylthio-phenol with heating. 5.8g (0.0368 mole) of p-chloronitrobenzene are added to the solution and reacted at 130° – 140°C for 4 hrs with heating. After the reaction, the resulting mixture is cooled, added with 50ml of water and extracted with benzene, the extract is washed with 5 percent sodium hydroxide to remove completely the excess of phenol, and benzene is removed to yield 9.5g (89.2 percent of theoretical value) of crude 3-n-propyl-4'-nitrodiphenyl ether, which can be recrystallized from ethanol (mp:52° – 53°C).

Analysis: $C_{15}H_{15}NO_3S$

| | | | |
|---|---|---|---|
| Calculated: | C : 62.25% | H : 5.19% | N : 4.64% |
| Found: | C : 62.26% | H : 5.22% | N : 4.84% |

EXAMPLE 3

3-n-propylsulfinyl-4'-nitrodiphenyl ether 5.0g (0.017 mole) of 3-n-propylthio-4'-nitrodiphenyl ether are dissolved in 25ml of acetic acid and 2.1g (0.0185 mole) of 30% $H_2O_2$ are added dropwise at 5° –10°C. After the completion of addition, the stirring is continued at room temperature for 2 hrs to complete the reaction. The resulting mixture is poured onto 70ml of ice water and extracted with benzene. The extract is washed with 5 percent aqueous sodium carbonate solution and then with water, dried with anhydrous sodium hydroxide and then benzene is removed under a reduced pressure at above 90°C of water bath temperature until the weight is constant, to yield the desired 3-n-propylsulfinyl-4'-nitrodiphenyl ether as a viscous brown oil.

Yield: 5.1g percent (96.7 percent of theoretical value): $n\ D^{25} = 1.6202$.

It may be crystalized from ethanol (mp: 50°C)

Analysis: $C_{15}H_{15}NO_4S$

| | | | |
|---|---|---|---|
| Calculated: | C : 57.59% | H : 4.33% | N : 4.62% |
| Found: | C : 57.72% | H : 4.50% | N : 4.81% |

EXAMPLE 4

3-n-propylsulfonyl-4'-nitrodiphenyl ether 5.5g (0.019 mole) of 3-n-propylthio-4'-nitrodiphenyl ether are dissolved in 30ml of acetic acid and 5.2g (0.045 mole) of 30% $H_2O_2$ are added dropwise thereto at 40° –50°C. After the completion of addition, the reaction mixture is heated at 90°C for 1hr to complete the reaction. The resulting mixture is cooled and poured into 300ml of ice water to crystalize gradually. The crystals are filtered, washed with water sufficiently and dried to yield 5.8g (94.7 percent of theoretical value) of desired 3-n-propylsulfonyl-4'-nitrodiphenyl ether, which can be recrystallized from ethanol (mp: 101° – 102°C)

Analysis: $C_{15}H_{15}NO_5S$

| | | | |
|---|---|---|---|
| Calculated: | C : 56.02% | H : 4.69% | N : 4.17% |
| Found: | C : 56.06% | H : 4.71% | N : 4.36% |

EXAMPLE 5

10 Parts of 4-methylsulfonyl-4'-nitrodiphenyl ether are mixed with 45 parts of talc and 45 parts of clay and ground to yield a powder agent, which is scattered as it is for use.

EXAMPLE 6

20 Parts of 2-chloro-4-methylthio-4'-nitrodiphenyl ether are mixed with 60 parts of kalin and 17 parts of diatomaceous earth and then with 1 part of alkyl naphthalene sulfonic acid salt and 2 parts of ligninsulfonic acid salt and ground to form a hydrating agent, which is suspended in water to use as liquid sprinkle.

EXAMPLE 7

20 Parts of 3-n-propylthio-4'-nitrodiphenyl ether are dissolved in 63 parts of xylene and mixed with 17 parts of alkyl phenol-ethylene oxide condensate to yield an emulsion, which is diluted with water to use as emulsion.

EXAMPLE 8

One part of polyoxyethylene alkyl ether is applied uniformly to the surfaces of 92 parts of lime stone particles having a particle size of 0.3 – 0.1mm and mixed with 7 parts of finely divided 2-chloro-4-methylsulfinyl-4'-nitrodiphenyl ether to coat the particles resulting in fine granules, which are scattered by hands or a scattering machine as they are.

EXAMPLE 9

7 parts of 2-chloro-4-methylsulfinyl-4'-nitrodiphenyl ether, 30 parts of bentonite, 60 parts of clay, 2 parts of lignisulfonic acid salt, 1 part of sodium alkylbenzenesulfonate are mixed sufficiently, kneaded with 18 parts of water and granulated by means of granulating machine. The resulting granules are dried in hot air and sieved through 0.5 – 1.0mm mesh to yield granules, which are scattered by hands or a scattering machine as they are.

What we claim is:

1. Compounds represented by the general formula

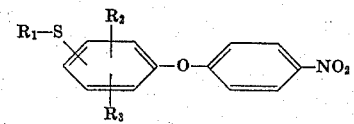

wherein $R_1$ represents a lower alkyl or allyl radical, $R_2$ represents a hydrogen or chlorine atom or a methyl radical, $R_3$ represents a hydrogen or chlorine atom and $R_2$ and $R_3$ may be identical or different.

2. Compounds according to claim 1 wherein the $R_1$-S- radical is at the $m$- or $p$- position of the phenyl radical.

3. Compounds according to claim 1 wherein the $R_1$-S- radical is at the $m$- position of the phenyl radical.

* * * * *